United States Patent
Liu et al.

(12) 
(10) Patent No.: US 11,874,967 B2
(45) Date of Patent: Jan. 16, 2024

(54) FORCE SENSING MODULE WITH VIBRATION FEEDBACK

(71) Applicant: TOPRAY MEMS INC., Hsinchu (TW)

(72) Inventors: Chin-Sung Liu, Hsinchu (TW); Shin-Ter Tsai, Hsinchu (TW); Hsiao-Ming Chien, Hsinchu (TW)

(73) Assignee: TOPRAY MEMS INC., Hsinchu (TW)

( * ) Notice: Subject to any disclaimer, the term of this patent is extended or adjusted under 35 U.S.C. 154(b) by 72 days.

(21) Appl. No.: 17/752,904

(22) Filed: May 25, 2022

(65) Prior Publication Data

US 2023/0333656 A1    Oct. 19, 2023

(30) Foreign Application Priority Data

Apr. 19, 2022  (TW) .................................. 111114897

(51) Int. Cl.
*G06F 3/01* (2006.01)
*G01L 1/12* (2006.01)

(52) U.S. Cl.
CPC .............. *G06F 3/016* (2013.01); *G01L 1/122* (2013.01)

(58) Field of Classification Search
CPC ................................. G06F 3/016; G01L 1/122
See application file for complete search history.

(56) References Cited

U.S. PATENT DOCUMENTS

| 2017/0090574 A1* | 3/2017 | Baer ........................ G06F 3/016 |
| 2019/0339776 A1* | 11/2019 | Rosenberg ............ G06F 3/0416 |

\* cited by examiner

*Primary Examiner* — Quan Zhen Wang
*Assistant Examiner* — Mancil Littlejohn, Jr.
(74) *Attorney, Agent, or Firm* — Lin & Associates Intellectual Property, Inc.

(57) ABSTRACT

A force sensing module with vibration feedback is disclosed, comprising: a substrate, a frame and a plurality of magnetic sensors; the substrate is disposed with at least one tactile actuator, and the substrate has a touch operation surface and a mounting surface on opposite sides, the tactile actuator is mounted on the mounting surface; the frame is disposed with at least three buffer spacers, the buffer spacers connect the frame to the substrate; the magnetic sensor includes a magnet and a Hall element, one of the magnet and the Hall element is disposed on the frame, and the other is disposed on the substrate; thereby when a force is applied on the touch operation surface to make the substrate generate an offset, the Hall element outputs a force signal due to the voltage change caused by the approaching magnet, and the signal drives the tactile actuator to generate a vibration feedback.

13 Claims, 8 Drawing Sheets

FORCE SENSING MODULE WITH VIBRATION FEEDBACK

BACKGROUND OF THE INVENTION

1. Field of the Invention

The present invention relates generally to a technical field of tactile feedback device, and more particularly, to a force sensing module with vibrational feedback.

2. The Prior Arts

Electronic products such as tablet computers, touchpads, etc. have begun to provide the function of tactile feedback. In order to make the product feedback in real time when triggered by force, it is necessary to work with a module that senses the force, so that the operator can operate the tactile feedback module with a better operating experience. There are many types of modules for sensing force, such as capacitive force sensors, piezoelectric actuators, stress change sensors, or pressure sensing grains embedded in elastic buffers. However, the unit price of such products is too high, and some structures are more complex. Therefore, to provide a force sensing module with a simplified structure and low cost to make the product more competitive in the market is the subject of the present disclosure.

SUMMARY OF THE INVENTION

In order to solve the above-mentioned problems, the primary objective of the present invention is to provide a force sensing module with vibration feedback, using a magnetic sensor as a force sensing unit, in combination with a separately disposed magnet or using a tactile actuator with magnet set, when the touch operation surface is pressed, the magnetic sensor outputs the voltage change as a force signal, and the signal drives the tactile actuator to generate a vibration feedback effect.

To achieve the foregoing objective, the present invention provides the following technical solutions:

The present invention provides a force sensing module with vibration feedback, comprising: a substrate, a frame and a plurality of magnetic sensors, the substrate being provided with at least one tactile actuator, and the substrate having a touch operation surface and a mounting surface on opposite sides, the tactile actuator being mounted on the mounting surface; the frame being disposed with at least three buffer spacers, the buffer spaces connecting the frame to the substrate; the magnetic sensor comprising a magnet and a Hall element, one of the magnet and the Hall element being disposed on the frame, the other one of the magnet and the Hall element being disposed on the substrate, and the positions of the magnet and the Hall element corresponding to each other and separated by a gap in a vertical direction. When a force is applied to the touch operation surface causing the substrate to generate an offset, the Hall element outputs a force signal representing a voltage change caused by the approaching magnet.

In a preferred embodiment, a gap is provided between the magnetic sensor and the buffer spacers, and the magnetic sensor is located adjacent to where the buffer spacers are located.

In a preferred embodiment, the frame comprises at least one elastic piece, the elastic piece produces elastic deformation, and the elastic piece is connected with the substrate through the buffer spacers.

In a preferred embodiment, the elastic piece is a protruding piece extending inward from the frame.

In a preferred embodiment, the frame also includes an extension piece, the extension piece extends inward from the frame and is located adjacent to the elastic piece, and the extension piece carries one of the Hall element and the magnet, the other one of the Hall element and the magnet is disposed on the substrate.

In a preferred embodiment, the buffer spacer is an elastic soft pad.

The present invention is a force sensing module with vibration feedback, comprising: a substrate, a frame, at least one tactile actuator and a plurality of magnetic sensors, the substrate having a touch operation surface and a mounting surface on opposite sides; the frame being disposed with at least three buffer spacers, the buffer spacers connecting the frame to the substrate; the tactile actuator comprising a magnet set and a coil set, one of the magnet set and the coil set being disposed on the substrate, the other of the magnet set and the coil set being disposed Getbeingdisposed on the frame; the magnetic sensor comprising a Hall element, the Hall element being disposed at the substrate or the frame where the coil set is located, the position of the Hall element corresponding to the magnet set and spaced by a gap. When a force is applied to the touch operation surface to cause the substrate to generate an offset and the magnet to approach the Hall element, the Hall element outputs a force signal representing a voltage change caused by the approaching magnet set.

In a preferred embodiment, a gap in a lateral direction is disposed between the magnetic sensor and the buffer spacers, and the tactile actuator and the magnetic sensor are located adjacent to where the buffer spacers are located.

In a preferred embodiment, the frame comprises at least one elastic piece, the elastic piece produces elastic deformation, and the elastic piece is connected with the substrate through the buffer spacers.

In a preferred embodiment, the elastic piece is a protruding piece extending inward from the frame.

In a preferred embodiment, the frame further comprises an extension piece, the extension piece extends inward from the frame and is located adjacent to the elastic piece, and the extension piece carries one of the magnet set and the coil set, the other one of the magnet set and the coil set is disposed on the substrate, and the position of the magnet set corresponds to the Hall element.

In a preferred embodiment, the frame further includes a lap piece, the lap piece is fixed to the frame and extends inward to the frame adjacent to the elastic piece, the lap piece carries one of the magnet set and the coil set, the other one of the magnet set and the coil set is disposed on the substrate.

In a preferred embodiment, the lap piece is made of a magnetic conductive metal, and the magnet set is disposed on the lap piece, and the coil set is disposed on the substrate.

Compared with the prior art, the force sensing module with vibration feedback of the present invention has the following specific effects:

1. The main magnetic sensor is composed of a Hall element, which can reduce the cost.
2. The magnetic sensor and the tactile actuator can share a magnet set, so that the overall structure can be simplified and the cost can be further reduced.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The technical solutions of the present invention will be described clearly and completely below in conjunction with the specific embodiments and the accompanying drawings. It should be noted that when an element is referred to as being "mounted or fixed to" another element, it means that the element can be directly on the other element or an intervening element may also be present. When an element is referred to as being "connected" to another element, it means that the element can be directly connected to the other element or intervening elements may also be present. In the illustrated embodiment, the directions indicated up, down, left, right, front and back, etc. are relative, and are used to explain that the structures and movements of the various components in this case are relative. These representations are appropriate when the components are in the positions shown in the Figures. However, if the description of the positions of elements changes, it is believed that these representations will change accordingly.

The accompanying drawings are included to provide a further understanding of the invention, and are incorporated in and constitute a part of this specification. The drawings illustrate embodiments of the invention and, together with the description, serve to explain the principles of the invention.

Figure 1:
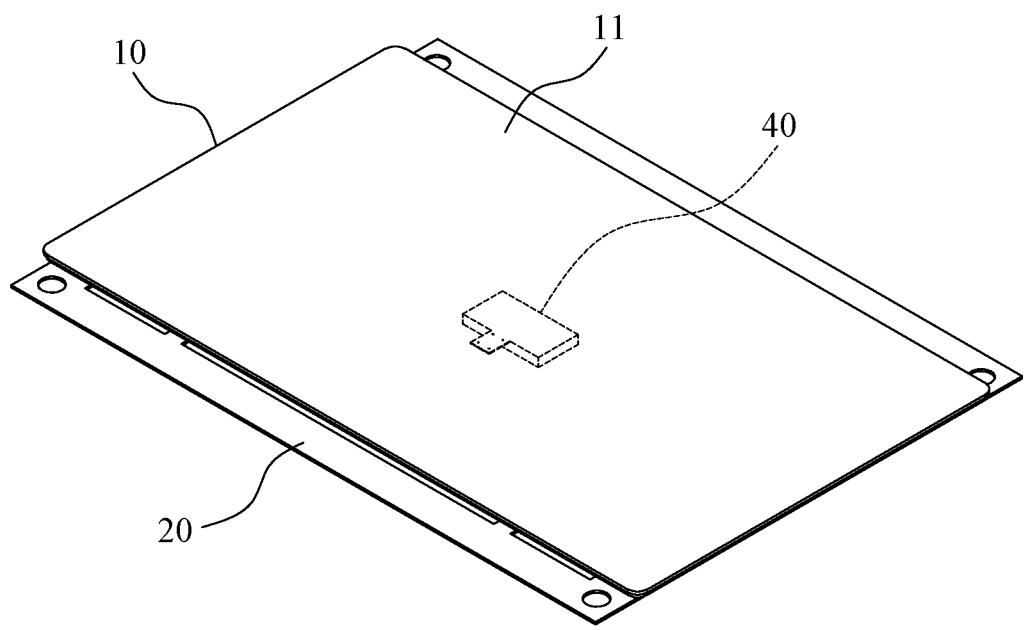
FIG. 1 is the perspective view of the first embodiment of the present invention.
Figure 2:
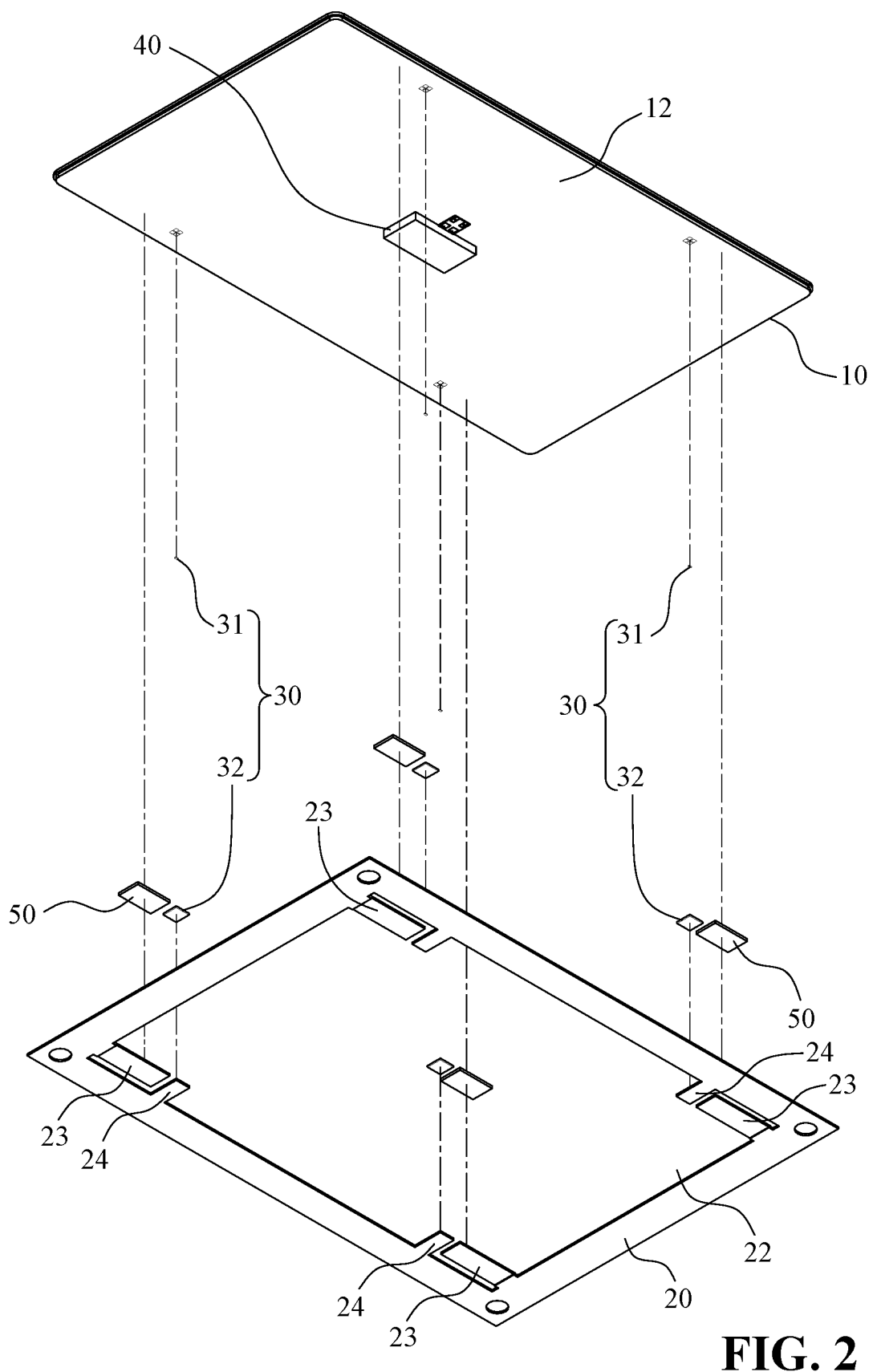
FIG. 2 is the exploded view of the first embodiment of the present invention.

FIG. 1 and FIG. 2 are a perspective view and an exploded view of the first embodiment of the present invention respectively. The force sensing module with vibration feedback according to the present invention includes a substrate 10, a frame 20 and a plurality of magnetic sensors 30. The substrate 10 is provided with at least one tactile actuator 40, the substrate 10 has a touch operation surface 11 and a mounting surface 12 located on opposite sides, and the tactile actuator 40 is mounted on the mounting surface 12. The frame 20 is provided with at least three buffer spacers 50, and the buffer spacers 50 connect the frame 20 to the substrate 10. The magnetic sensor 30 includes a Hall element 31 and a magnet 32. When one of the Hall element 31 and the magnet 32 is disposed on the substrate 10, the other is disposed on the frame 20. The positions of the Hall element 31 and the magnet 32 correspond to each other and are separated by a gap in a vertical direction through the buffer spacers 50; thus, when the operator exerts force on the touch operation surface 11 with fingers, the substrate 10 will have an offset, and the offset will make the Hall element 31 show a voltage change because the Hall element 31 is approached by the magnet 32, the voltage change is output as a force signal, and the signal will be used by the internal controller to drive the tactile actuator 40 to operate, so that the substrate 10 moves relative to the frame 20 back-and-forth, so as to obtain the desired vibration feedback effect.

Next, a detailed description of each component is made: the substrate 10 is a single-layer or multi-layer structure, and used in an electronic device that can provide touch sensing, such as a touch panel, a flat keyboard, a touch screen of a tablet computer, etc. When a finger, a stylus or other contact interface contacts the electronic device, a relative electronic signal is generated, and the tactile actuator 40 can be driven to vibrate synchronously, so that a tactile feedback vibration can be felt at the operating position of the contact point.

The magnetic sensor 30 includes the Hall element 31 and the magnet 32, and when one of them is disposed at the frame 20, the other is disposed at the substrate 10. In the present embodiment, the magnet 32 is disposed on the frame 20, and the Hall element 31 is embedded on the mounting surface 12 of the substrate 10. The Hall element 31 will show a voltage change when the magnet 32 approaches or moves away, and the voltage change is output as a force signal through a circuit of the substrate 10. The magnetic sensor 30 is located adjacent to a corresponding buffer spacer 50 with a gap in a lateral direction between the magnetic sensor 30 and the corresponding buffer spacer 50.

The frame 20 is mainly responsible for carrying the substrate 10, and the frame 20 has a hollow area 22 in the middle. The buffer spacer 50 is disposed between the frame 20 and the substrate 10. The buffer spacer 50 is a soft pad with elasticity, and is mainly responsible for keeping the substrate 10 to vibrate significantly with respect to the direction of the frame 20 when the tactile actuator 40 operates. Significant vibration is generated to obtain a good vibration feedback effect. In addition, in the present invention, the buffer spacer 50 also has the function of allowing the magnetic sensor 30 to obtain good sensing. Therefore, the frame 20 includes at least one elastic piece 23. In the present embodiment, there are four elastic pieces 23, which are protruding pieces extending inward from the frame 20, such as finger-shaped, located at the edge of the four corners of the hollow area 22. The elastic piece 23 can generate elastic deformation toward or away from the substrate 10, and the end of the elastic piece 23 is connected to the substrate 10 through the buffer spacer 50. Moreover, the frame 20 further includes an extension piece 24. The extension piece 24 also extends inward from the frame 20 and is located adjacent to the end of the elastic piece 23. The extension piece 24 fixes one of the Hall element 31 and the magnet 32. In the present embodiment, the extension piece 24 is used to fix the magnet 32. In the present invention, the distribution positions and numbers of the magnetic sensors 30 correspond to the buffer spacers 50, and since the buffer spacers 50 are located at the end of the elastic piece 23, when the operator exerts force on the touch operation surface 11, the substrate 10 at this location will generate a definite offset due to the force, which helps the Hall element 31 to be subjected to the magnet 32 to show a definite voltage change, so that the magnetic sensor 30 outputs a definite signal. Then, the data of the distributed magnetic sensors 30 are integrated and analyzed to determine whether to drive the tactile actuator 40.

The tactile actuator 40 is a vibration source for driving the substrate 10 to generate an offset relative to the frame 20. The tactile actuator 40 can be of various types, such as a vibration motor, a linear motor, and the like according to manufacturer's needs. In the present embodiment, the tactile actuator 40 is mounted at the central position of the mounting surface 12 to obtain a uniform vibration feedback effect.

In the above embodiment of the force sensing module with vibration feedback, the magnetic sensor 30 corresponds to the position of the buffer spacer 50. When the operator applies force to the substrate 10, the force causes the connected elastic piece 23 or the buffer spacer 50 to further cause, in turn, the substrate 10 to move an offset, and the magnetic sensor 30 takes the voltage change as a force signal, which is used by the controller to drive the tactile actuator 40 to generate vibration, which causes the substrate 10 to be displaced with respect to the frame 20 to achieve the effect of vibration feedback.

Figure 3:
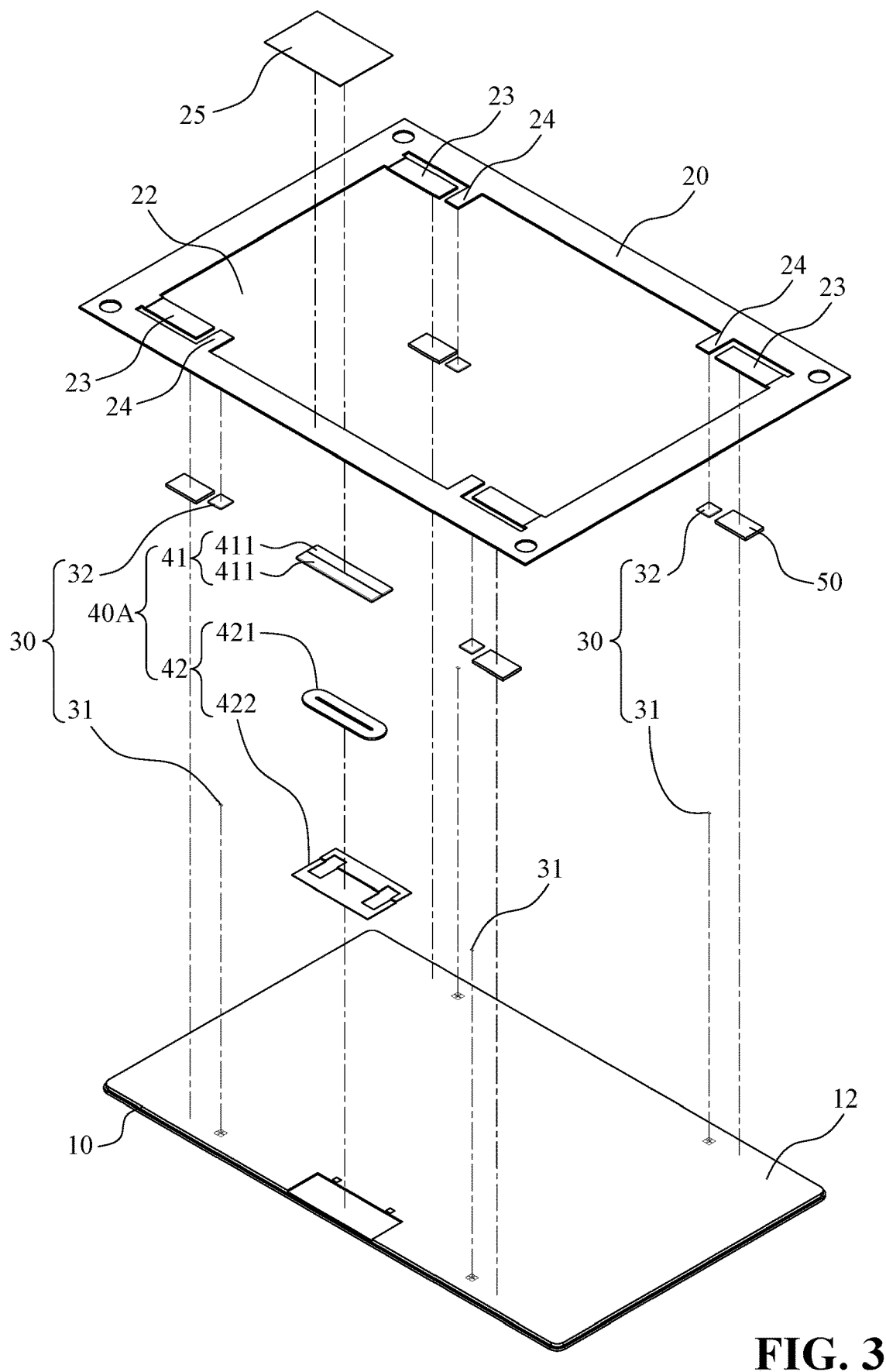
FIG. 3 is the exploded view of the second embodiment of the present invention.
Figure 4:
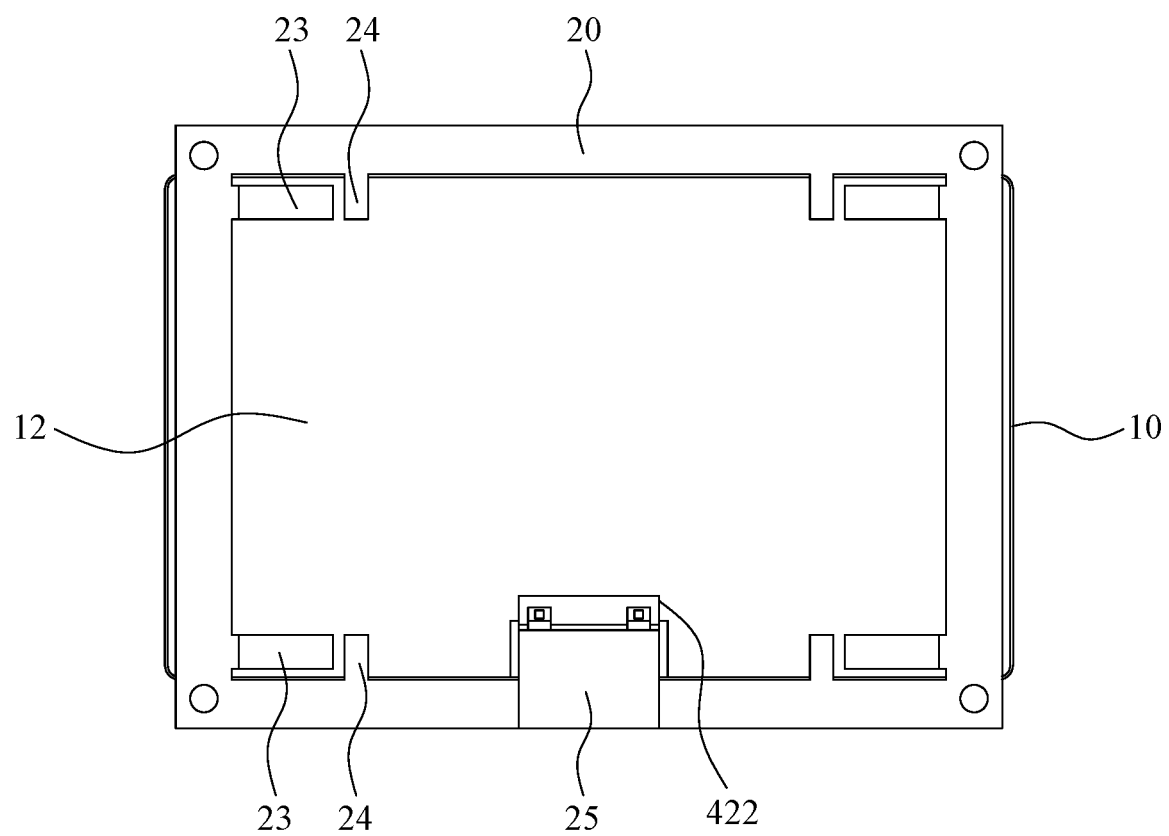
FIG. 4 is the structural planar view of the second embodiment of the present invention.

FIG. 3 and FIG. 4 are an exploded view and a structural planar view of a second embodiment of the present invention. In the present embodiment, another type of tactile actuator 40A is used, and the tactile vibrator 40A includes a magnet set 41 and a coil set 42. The magnet set 41 includes a plurality of first magnets 411 arranged side by side. The plurality of the first magnets 411 are downwardly fixed to a lap piece 25. The lap piece 25 is fixed to the frame 20 and extends toward the hollow area 22. The coil set 42 includes at least one set of coils 421 and a carrier piece 422. The coil 421 is fixed on the carrier piece 422, and the carrier piece 422 is fixed on the mounting surface 12. After the mounting surface 12 can be energized by electricity, the coil 421 can generate opposite magnetic poles. In the present embodiment, the carrier piece 422 is fixed on the mounting surface 12 of the substrate 10 and connected to the circuits on the substrate 10. On the other hand, the magnet set 41 can also be disposed at the substrate 10, and the coil set 42 is disposed at the frame 20. It can be seen that the type of the tactile actuator 40 of the force sensing module with vibration feedback in the present invention is not limited to a specific type, and any suitable type can be used.

Figure 5:
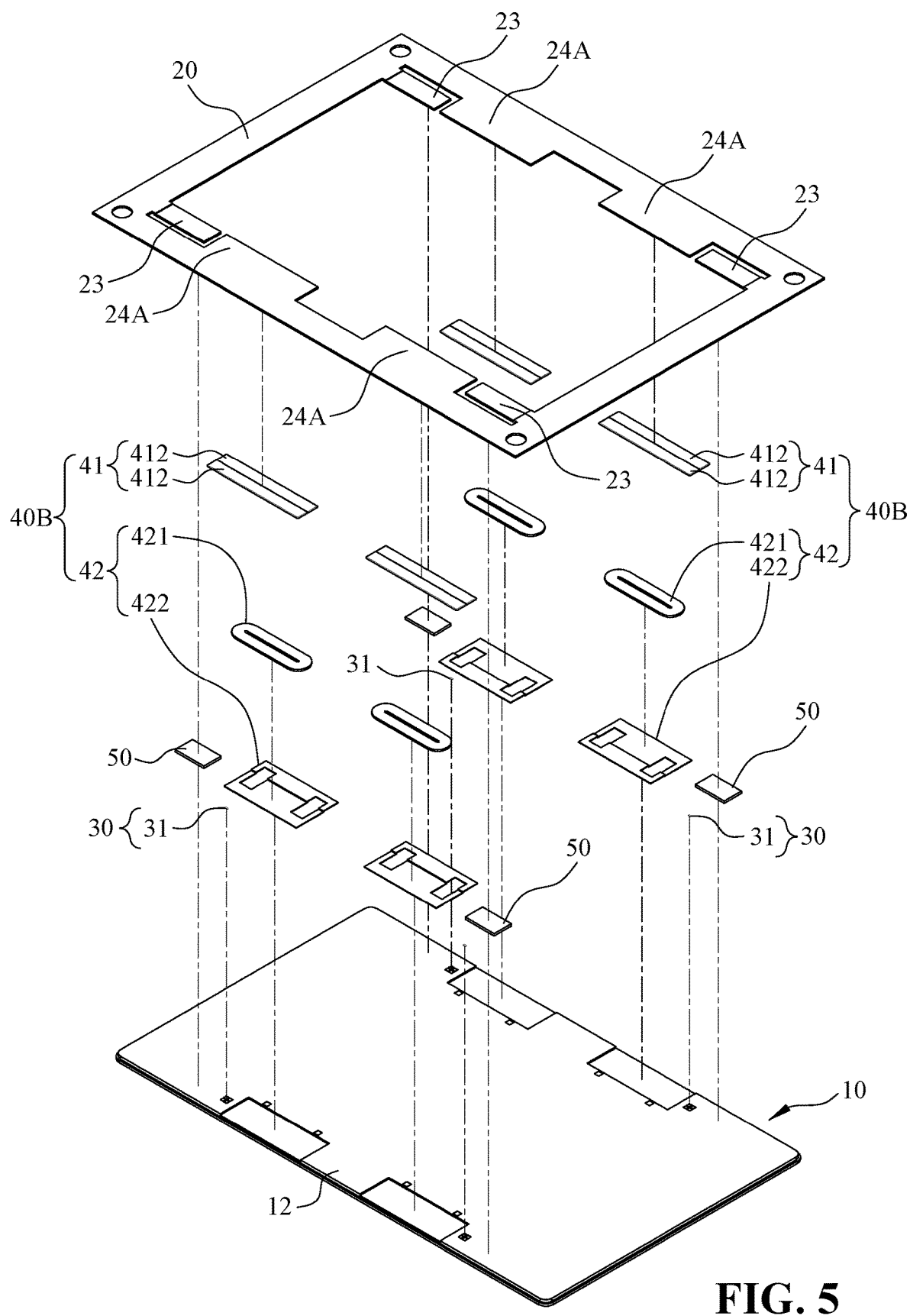
FIG. 5 is the exploded view of the third embodiment of the present invention.
Figure 6:
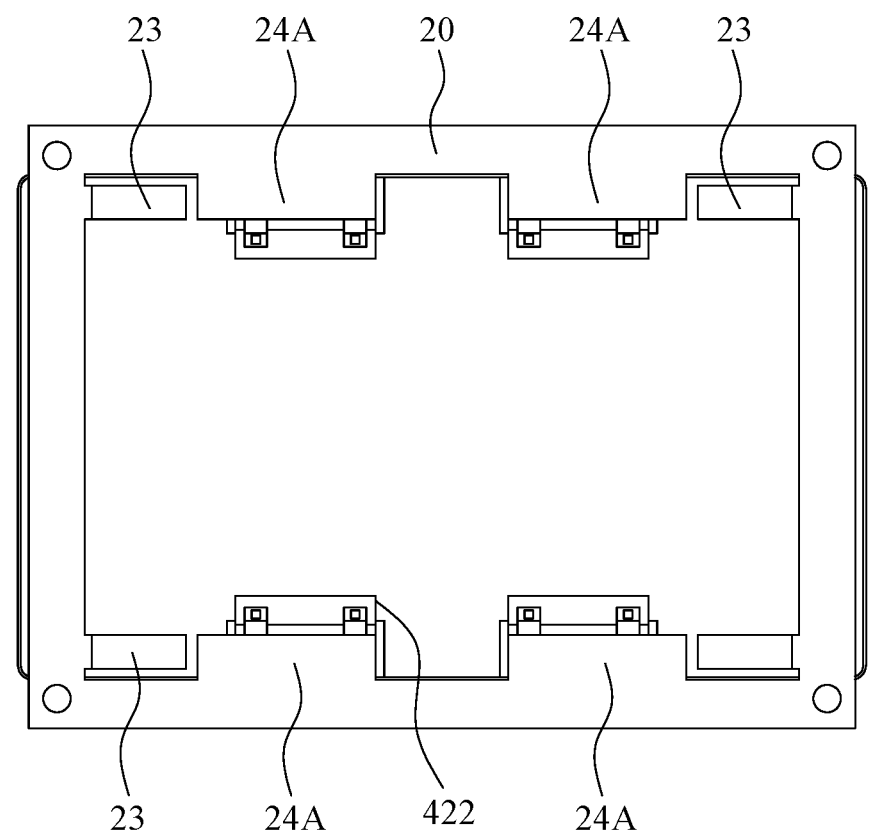
FIG. 6 is the structural planar view of the third embodiment of the present invention.

FIG. 5 and FIG. 6 are an exploded view and a structural planar view of the third embodiment of the present invention, respectively. The present embodiment provides a more compact structure, mainly because the magnetic sensor 30 and the tactile actuator 40B share the same set of magnets, thereby making the structure more compact. In the present embodiment, the present invention provides a force sensing module with vibration feedback, including: the substrate 10, the frame 20, an array of magnetic sensors 30 and at least one tactile actuator 40B. The substrate 10 has the touch operation surface 11 and the mounting surface 12 located opposite to each other. The frame 20 is provided with at least three buffer spacers 50, and the buffer spacers 50 are connected between the frame 20 and the substrate 10. The tactile actuator 40B includes a magnet set 41 and a coil set 42. One of the magnet set 41 and the coil set 42 is disposed on the substrate 10, and the other of the magnet set 41 and the coil set 42 is disposed on the frame 20. The magnetic sensor 30 includes the Hall element 31. The Hall element 31 is disposed on the substrate 10 or the frame 20 where the coil set 42 is located. The location of Hall element 31 corresponds to the magnet set 41 and is separated by a gap. When the operator exerts a force on the touch operation surface 11, the substrate 10 is displaced, and the Hall element 31 is approached by the magnet set 41 and the resulted voltage change is output as a force signal.

It can be seen from the above that the Hall element 31 and the coil set 42 are disposed on the same component. In the present embodiment, the Hall element 31 is disposed on the mounting surface 12 of the substrate 10, and the coil 421 of the coil set 42 is also disposed on the mounting surface 12 via the carrier piece 422, and is electrically connected to the circuit of the substrate 10. The magnet set 41 includes a plurality of second magnets 412. In the present embodiment, the length of the second magnets 412 is longer so as to correspond to the position of the Hall element 31. In addition, in order to ensure good sensing in the magnetic sensor 30, the frame 20 is still provided with at least one elastic piece 23, and the elastic piece 23 is provided with four protruding pieces extending inward from the frame 20, such as finger-shaped. The frame 20 is further provided with at least one extension piece 24A. There are four extension pieces 24A extending inward from the frame 20 and located adjacent to the elastic piece 23. The extension pieces 24A are used to fix one of the magnet set 41 and the coil set 42. In the present embodiment, the extension piece 24A is fixed to the plurality of second magnets 412, so the size is larger, and the position of the second magnets 412 corresponds to the Hall element 31 embedded in the substrate 10. In the present embodiment, the distribution positions and numbers of the magnetic sensors 30 also correspond to the buffer spacers 50, and the elastic pieces 23 are used to generate elastic deformation. When the force is applied to the touch operation surface 11, the substrate 10 produces a definite offset and the magnet set 41 approaches the Hall element 31, so that the Hall element 31 outputs a force signal caused by the approaching magnet set 41.

Figure 7:
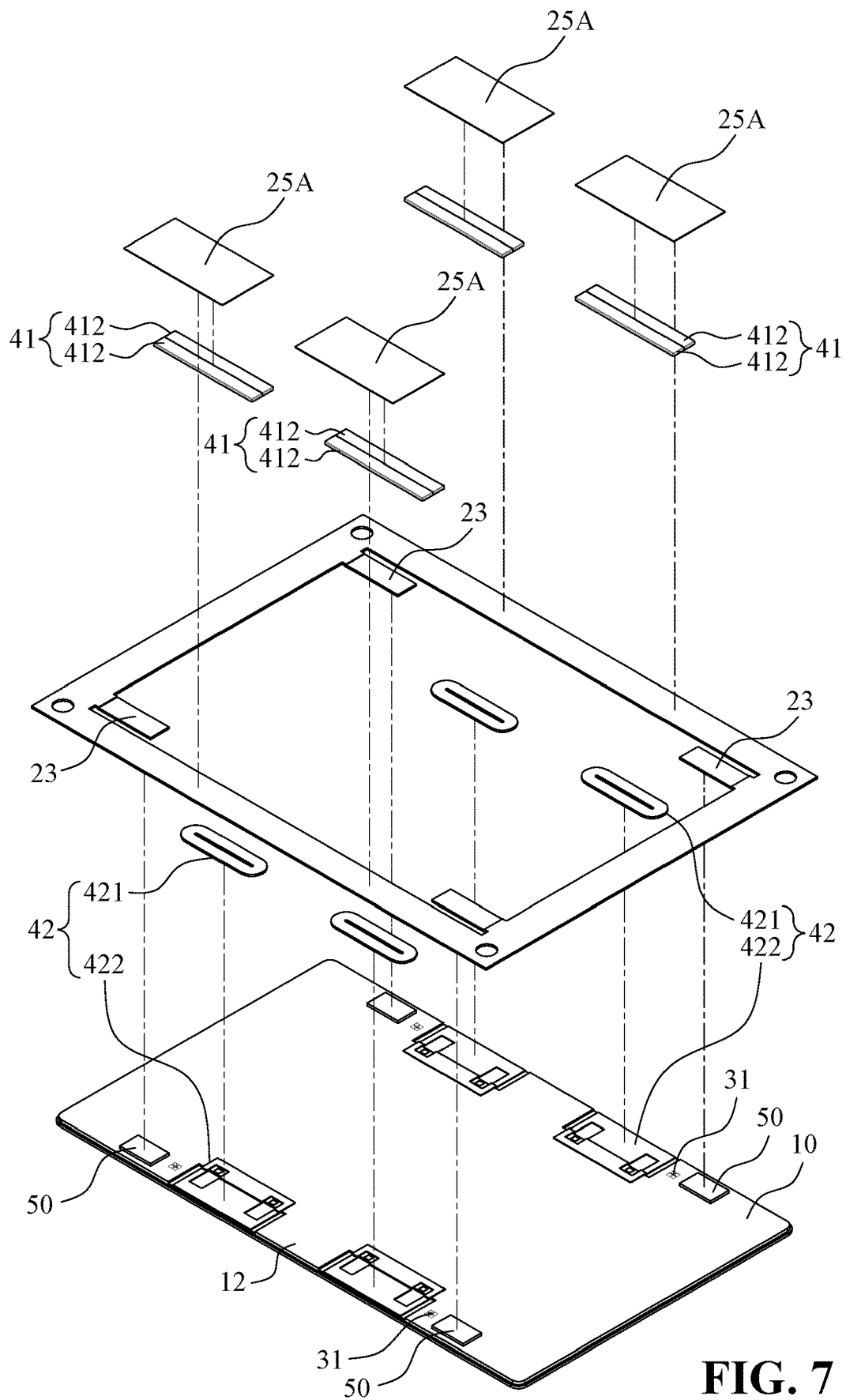
FIG. 7 is the exploded view of the fourth embodiment of the present invention.
Figure 8:
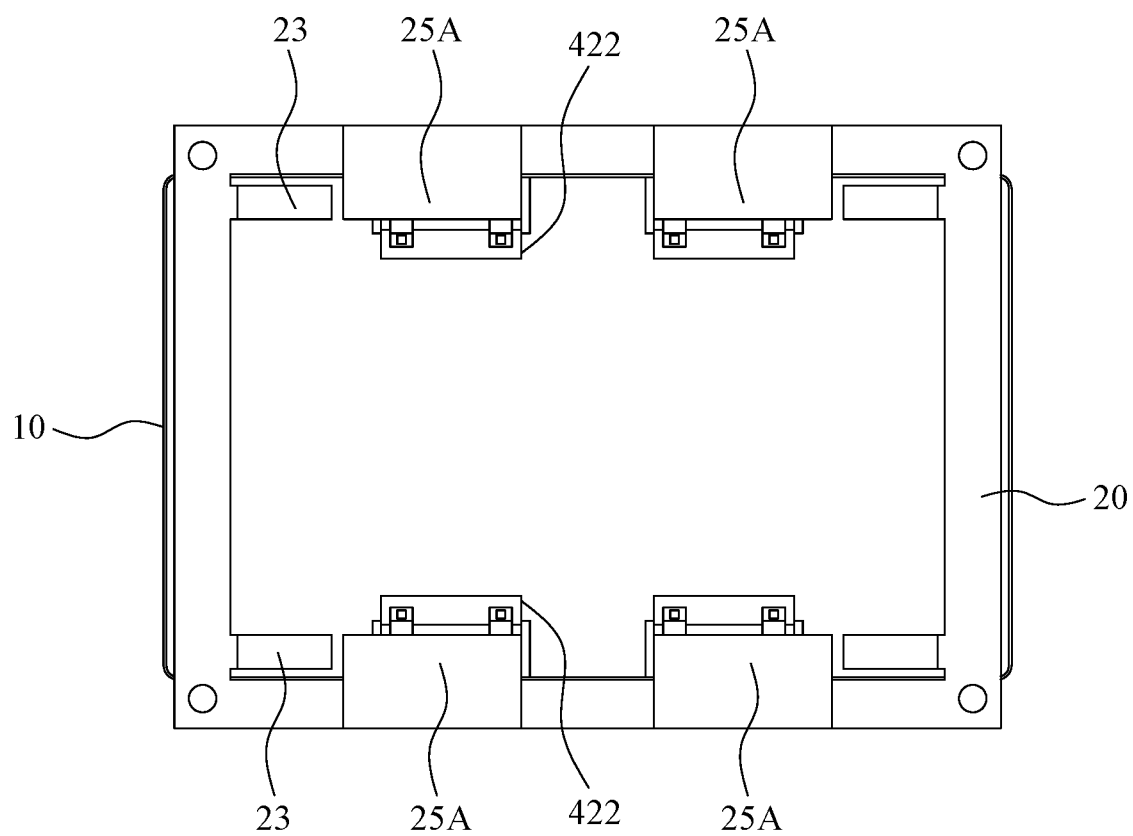
FIG. 8 is a structural planar view of a fourth embodiment of the present invention.

FIG. 7 and FIG. 8 are an exploded view and a structural planar view of the fourth embodiment of the present invention, respectively. The difference between the present embodiment and the third embodiment is that the magnet set 41 is fixed at the lap piece 25A, and the lap piece 25A is fixed on the frame 20 and extends toward the hollow area 22. In the present embodiment, in order to fix the magnet set 41, the size of the lap piece 25A is larger than that of the lap piece 25 of the second embodiment and the position is adjacent to the elastic piece 23, with a size also corresponding to the second magnet 412. In addition, in the present embodiment, the lap piece 25A can be made of a magnetically conductive metal, and the magnetically conductive metal helps to enhance the magnetic force of the magnet set 41.

In summary, the present invention provides a force sensing module with vibration feedback, which utilizes the Hall element 31 of the magnetic sensor 30 as a force sensing unit, in combination with a separately established magnet 32 or a tactile actuator 40B with a magnet set 41; when the operator exerts a force on the touch operation surface 11 to cause the substrate 10 to generate an offset, the magnet approaches the Hall element 31 to cause a voltage change, which is outputted as a force signal. The signal is used by the controller to drive the tactile actuator 40B to vibrate the substrate 10, and finally to achieve the desired vibration feedback effect. The present invention can reduce the cost, simplify the structure, and make the product more competitive in the market.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A force sensing module with vibration feedback, comprising:
   a substrate, provided with at least one tactile actuator, and the substrate having a touch operation surface and a mounting surface on opposite sides, the tactile actuator being mounted on the mounting surface;

a frame, disposed with at least three buffer spacers, the buffer spacers connecting the frame to the substrate; and a plurality of magnetic sensors, each magnetic sensor further comprising: a magnet and a Hall element, one of the magnet and the Hall element being disposed on the frame, the other one of the magnet and the Hall element being disposed on the substrate, and the positions of the magnet and the Hall element corresponding to each other and separated by a gap in a vertical direction; when a force applied to the touch operation surface causes the substrate to generate an offset and the magnet to approach the Hall element, the Hall element outputting a force signal representing a voltage change caused by the approaching magnet;

wherein the magnetic sensor is located adjacent to a corresponding buffer spacer with a gap in a lateral direction between the magnetic sensor and the corresponding buffer spacer.

2. The force sensing module with vibration feedback according to claim 1, wherein the frame comprises at least one elastic piece, the elastic piece produces elastic deformation, and the elastic piece is connected with the substrate through the buffer spacers.

3. The force sensing module with vibration feedback according to claim 2, wherein the elastic piece is a protruding piece extending inward from the frame.

4. The force sensing module with vibration feedback according to claim 2, wherein the frame further comprises an extension piece, the extension piece extends inward from the frame and is located adjacent to the elastic piece, and the extension piece carries one of the Hall element and the magnet, the other one of the Hall element and the magnet is disposed on the substrate.

5. The force sensing module with vibration feedback according to claim 1, wherein the buffer spacer is an elastic soft pad.

6. The force sensing module with vibration feedback according to claim 1, wherein the tactile actuator is driven by a signal to cause the substrate to generate an offset with respect to the frame.

7. A force sensing module with vibration feedback, comprising:

a substrate, having a touch operation surface and a mounting surface on opposite sides;

a frame, disposed with at least three buffer spacers, the buffer spacers connecting the frame to the substrate;

at least one tactile actuator, each tactile actuator further comprising a magnet set and a coil set, one of the magnet set and the coil set being disposed on the substrate, the other of the magnet set and the coil set being disposed on the frame; and a plurality of magnetic sensors, each magnetic sensor further comprising a Hall element, the Hall element being disposed at the substrate or the frame where the coil set is located, the position of the Hall element corresponding to the magnet set and spaced by a gap in a vertical direction; when a force applied to the touch operation surface causes the substrate to generate an offset and the magnet set to approach the Hall element, the Hall element outputting a force signal representing a voltage change caused by the approaching magnet set;

wherein the magnetic sensor and the tactile actuator are located adjacent to a corresponding buffer spacer with a gap in a lateral direction between the magnetic sensor and the corresponding buffer spacer.

8. The force sensing module with vibration feedback according to claim 7, wherein the frame comprises at least one elastic piece, the elastic piece produces elastic deformation, and the elastic piece is connected with the substrate through the buffer spacers.

9. The force sensing module with vibration feedback according to claim 8, wherein the elastic piece is a protruding piece extending inward from the frame.

10. The force sensing module with vibration feedback according to claim 8, wherein the frame further comprises an extension piece, the extension piece extends inward from the frame and is located adjacent to the elastic piece, and the extension piece carries one of the Hall element and the magnet, the other one of the Hall element and the magnet is disposed on the substrate, and the position of the magnet set corresponds to the Hall element.

11. The force sensing module with vibration feedback according to claim 8, wherein the frame further includes a lap piece, the lap piece is fixed to the frame and extends inward to the frame adjacent to the elastic piece, the lap piece carries one of the magnet set and the coil sets, the other one of the magnet set and the coil set is disposed on the substrate, and the position of the magnet set corresponds to the Hall element.

12. The force sensing module with vibration feedback according to claim 11, wherein the lap piece is made of a magnetic conductive metal, and the magnet set is disposed on the lap piece, and the coil set is disposed on the substrate.

13. The force sensing module with vibration feedback according to claim 7, wherein the buffer spacer is an elastic soft pad.

* * * * *